Dec. 6, 1932.  A. L. FREEDLANDER  1,890,080
DOUBLE COG BELT
Filed Aug. 8, 1928  3 Sheets-Sheet 2

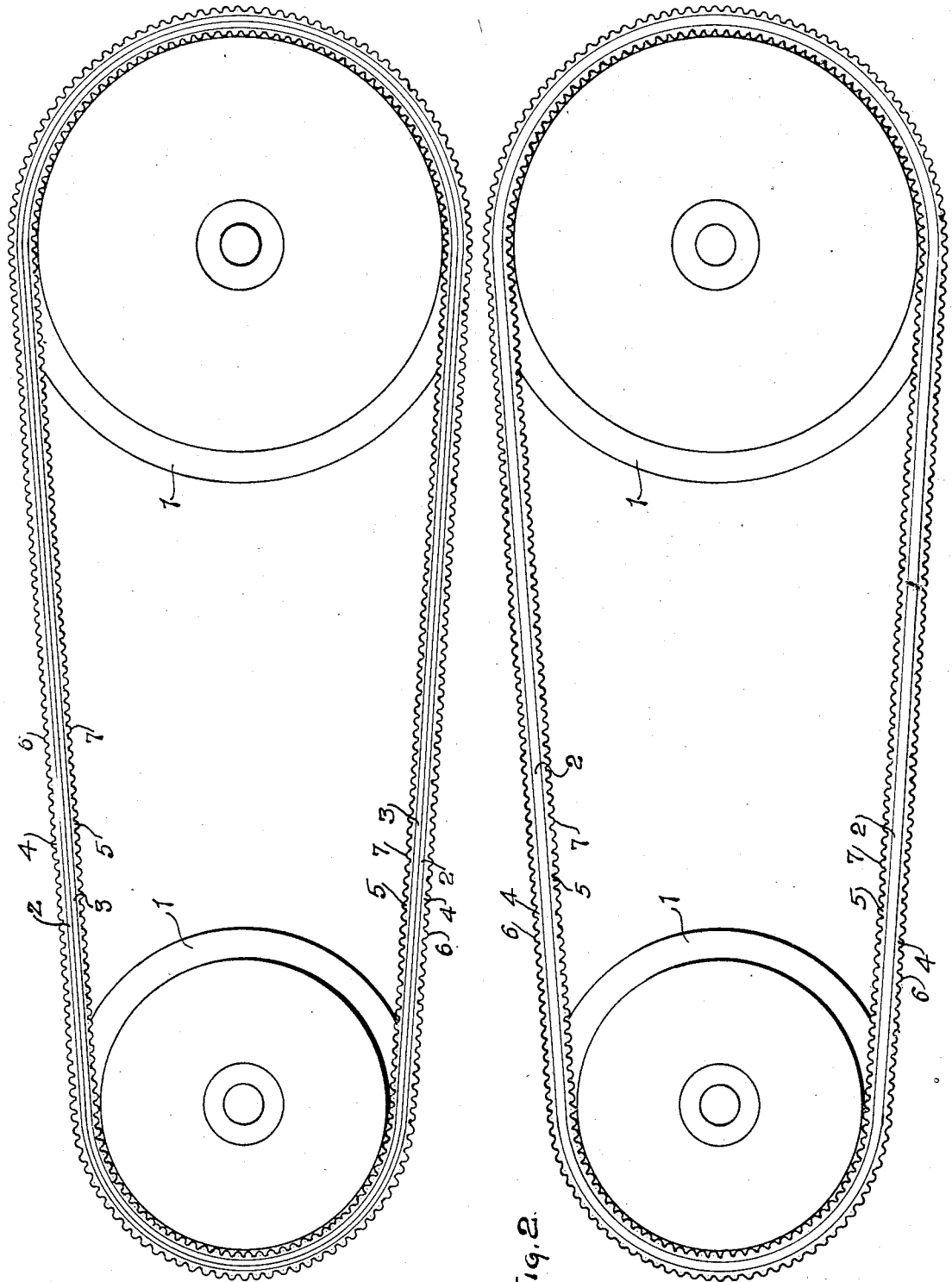

Inventor
ABRAHAM L. FREEDLANDER,
By
Toulmin & Toulmin
Attorneys

Dec. 6, 1932.  A. L. FREEDLANDER  1,890,080
DOUBLE COG BELT
Filed Aug. 8, 1928  3 Sheets-Sheet 3
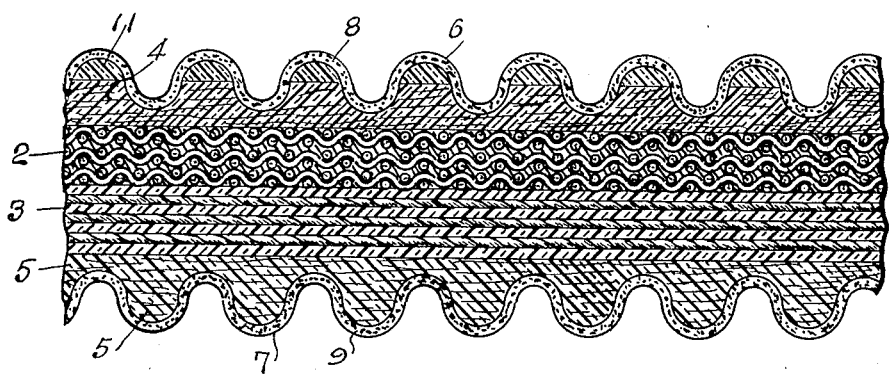
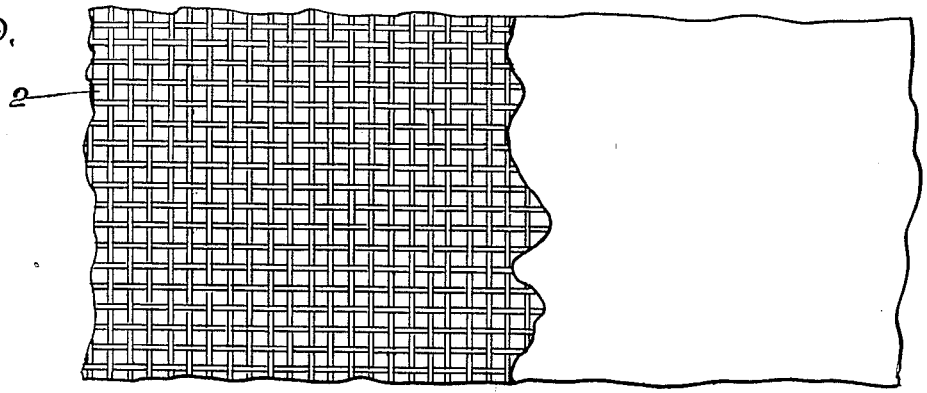
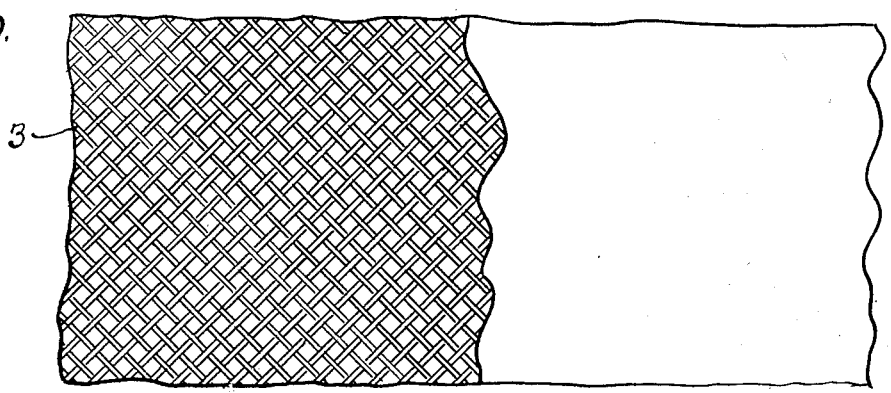
ABRAHAM L. FREEDLANDER, Inventor
BY Toulmin & Toulmin
Attorneys

Patented Dec. 6, 1932

1,890,080

UNITED STATES PATENT OFFICE

ABRAHAM L. FREEDLANDER, OF DAYTON, OHIO

DOUBLE COG BELT

Application filed August 8, 1928. Serial No. 298,217.

This invention embraces an improved driving belt of a general V-shape formation, but one that is wider and longer than the ordinary V-shaped belt.

It is an object of this invention to provide a belt of this type that is rigid in cross section but has circumferential or longitudinal flexibility.

It is also an object of this invention to provide a belt of this general type in which the intermediate member or members of the belt is made of rubberized fabric, or cord, or both, while the inner and outer members are composed of soft rubber mixed with fibers and have formed thereon transverse ribs or cogs. These ribs or cogs on the inner and outer surfaces of the belt may be, and are ordinarily, formed of soft vulcanized rubber mixed with cotton, wool or other fibers, the fibers generally running crosswise for the purpose of giving it a certain degree of rigidity without destroying its flexibility.

For the purpose of still greater rigidity these cross ribs or cogs may have some stiffening material imbedded therein, such as cord, soft wire, or some similar material. In the place of having soft wire or cord imbedded in the ridges, the ridges or cogs may be formed of hard rubber having for their support the inner and outer members of soft vulcanized, fiberized rubber.

It is more particularly an object of this invention to provide a belt composed of an outer corrugated member of soft vulcanized rubber mixed with fibers, an intermediate member of cord or fabric, or the two together, and an inner corrugated member of soft rubber, similar to that of the outer member.

It is a still further object of this invention to provide a belt that has transverse rigidity with circumferential or longitudinal flexibility, together with strength and durability and a maximum amount of frictional surface.

It is also an object of this invention to provide a belt having raw edges that constitute the driving surfaces of the belt.

For the purpose of illustration, there is presented herewith a preferred embodiment of this invention which is by way of illustration only.

Referring to the drawings,

Figure 1 is an edge view of a four-member belt shown applied to pulleys.

Figure 2 is a similar view showing a three-member belt.

Figure 8 is a view of the belt similar to that shown in Figure 5 except the hard rubber is shown on the one side of the belt.

Figure 9 is a longitudinal sectional view of the belt showing a layer of fabric cut lengthwise of the strands.

Figure 10 is a similar view to Figure 9 showing the fabric cut on a bias.

Figure 3:
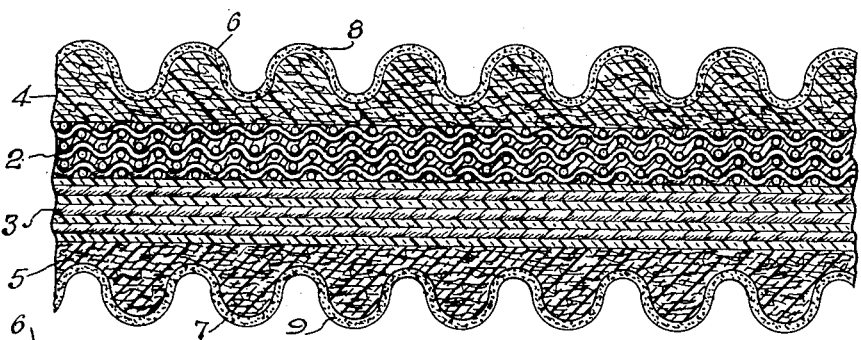
Figure 3 is an enlarged view of the belt shown in Figure 1.

1 designates the pulleys over which the belt is shown to be engaged. In Figure 2 the belt is shown to be a three-member belt. The intermediate member indicated by 2 is composed of rubberized cord, threaded fabric or straight cut woven fabric shown in Figure 7. This member is composed of this material in one or more layers of cord or fabric, according to the desired strength and thickness of the belt. This part of the belt is thoroughly rubberized.

On each side of the intermediate member 2 of the belt is a member of soft rubber thoroughly mixed with fiber and the fibers are so arranged and formed that each fiber extends generally in a direction transverse of the belt. This part is indicated by 4 for the outer member of the belt and by 5 for the inner member of the belt. On the inner and outer surfaces of the belt, there are formed transverse ridges or cogs 6 and 7. These cogs are formed on the belt so as to alternate with each other, that is the cogs on the outer member of the belt are transversely even with the depressions formed by two cogs on the inner member of the belt.

To each surface of the belt thus formed, composed of the intermediate body member and inner and outer members of soft rubber mixed with fiber and corrugated as above described, there is applied a layer of rubberized fabric 8 and 9, which closely fits the corrugated or cogged surfaces above described. These layers preserve the rubber surface of the belt from wearing and cracking due to strain and bending. These protective layers may be arranged so that the strands of the fabric run lengthwise of the belt and crosswise thereof, or strips of fabric may be cut bias, but it is unnecessary for this part of the belt to be formed of fabric cut bias, since the cog shape of the outer surface of the belt amply allows for the expansion and contraction of the surfaces of the belt. In fact, there is very little expansion in the outer fabric layer, merely a bending or straightening at certain points. The cross ribs or cogs not only effect transverse rigidity but they also afford added friction surfaces on both sides as well as the edges of the belt.

In Figures 3, 4, 5 and 6 there is shown a four-member belt in which the inner and outer members are constructed in the same manner and of the same material as the belt shown in Figure 2. The intermediate members of this belt, two in number, are constructed one of rubberized cord adjacent the inner member indicated by 3, and the other of straight cuts of rubberized woven fabric, adjacent the outer member, indicated by 2, or it may be cut on a bias. The part indicated by the numeral 2 and the part indicated by 4 form what might be called the tension members of the belt, while the part indicated by the numeral 5 in these belts composed of stiflex constitute what might be termed the compression member.

The tension member is well adapted for longitudinal expansion while the belt is traveling around the pulleys, but the compression member is well adapted to resist cross compression due to the transverse arrangement of the fibers in the rubber. The part indicated by 3 and composed of rubberized cord or fabric is constructed to resist both compression and longitudinal expansion and composes the main working body of the belt which is substantially inextensible and constitutes the neutral axis of the belt. The relative position of the parts of the four-member belt is well shown in Figures 3, 4, 5, 6 and 8, while the relative position of the three-member belt is shown in Figure 7.

Figure 4:
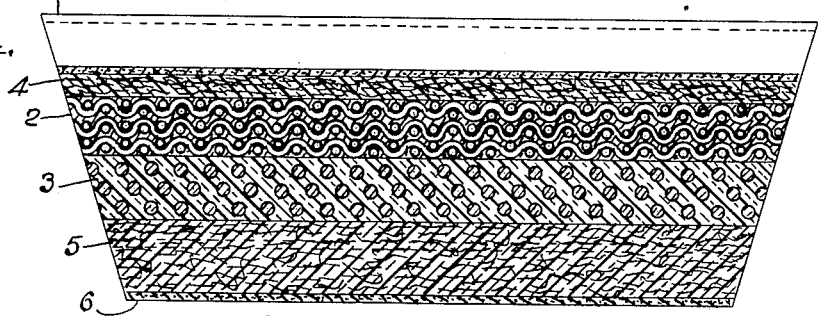
Figure 4 is a cross section of the belt shown in Figures 1 and 3.
Figure 6:
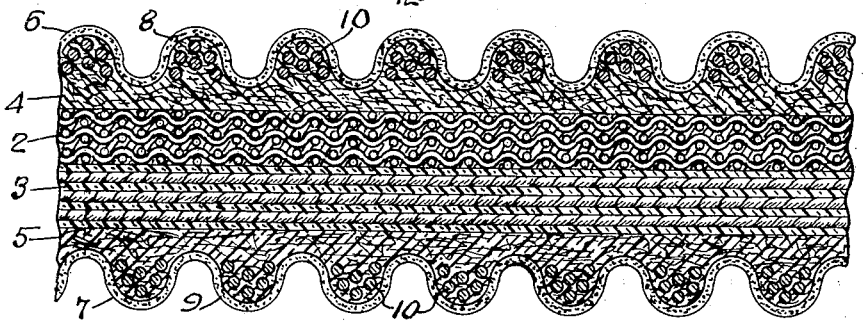
Figure 6 is a view of a four-member belt showing the surface teeth having imbedded therein transverse cords or soft wires.
Figure 7:
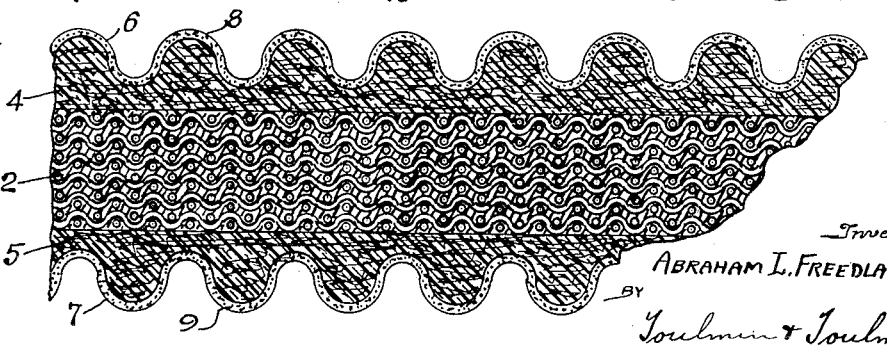
Figure 7 is an enlarged view of the form of belt shown in Figure 2.

Figure 6 shows a four-member belt of which all the members are constructed similar to the belt shown in Figures 3 and 4, with the exception of the cords or soft wires indicated by 10. These soft wires or cords are imbedded in the soft vulcanized rubber forming the rib or cog part of the belt. These soft wires or cords are imbedded in the cross ribs or cogs for the purpose of giving transverse rigidity to the belt and at the same time not interfering with its longitudinal flexibility.

These cross members are imbedded in the rubber beneath the outside coating indicated by 8 and 9, the fabric of which is arranged on the bias.

Instead of having cogs composed of soft vulcanized rubber in which straight cords or soft wires are imbedded, the cross cogs or ridges may be composed of hard rubber supported by the layer of soft rubber to which they are vulcanized. The ridges or cogs of hard rubber are held in firm engagement with the underpart of soft rubber by means of the usual heretofore described layers 8 and 9 of protecting fabric.

Figure 5:
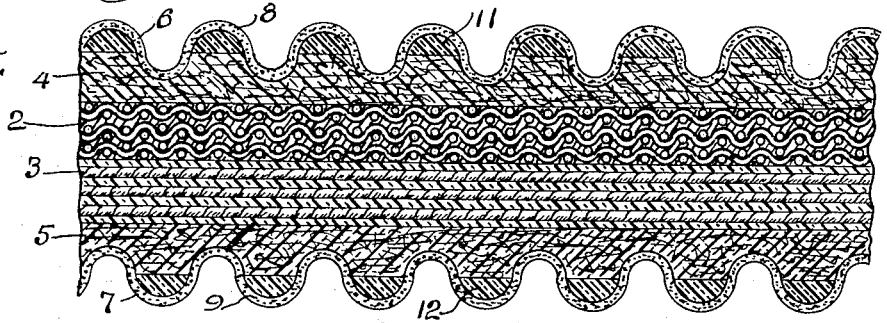
Figure 5 is a view of a four member belt showing the outer part of the surface which is composed of hard rubber.

Figure 5 shows hard rubber as forming the outer part of the cogs or ridges 11 and 12, on each side of the belt, while Figure 8 shows the hard rubber on the outer part of the cogs or ridges on one side of the belt only, which is preferably the outside part of the belt. But the hard rubber may be on either side.

Having thus fully described my invention what I claim as new and desire to protect by Letters Patent is:

1. A driving belt comprising an inner or compression member having as part of its outer surface transverse strengthening means of greater rigidity than the material of the compression member, an inextensible neutral member composed of circumferentially wound cord, and an outer or extension member having as part of its outer surface transverse strengthening means.

2. A driving belt comprising an inner or compression member having as part of its outer surface transverse strengthening means and an inextensible neutral member composed of circumferentially wound cord, an outer or extension member having as part of its outer surface transverse strengthening means consisting of hard rubber.

3. In a driving belt, comprising an inner or compression member having on its outer surface cog-like structure, said cog-like structure having imbedded therein crosswise of the belt strands of soft wire to give the belt transverse rigidity.

4. In a driving belt comprising a body having an inner and outer surface covered with rubberized fabric, cogs within said outer surface to give transverse rigidity and longitudinal flexibility, said cogs being constructed of a material more dense and rigid than the part of the material supporting it, the cogs on the inner surface being composed of the same material as the underlying part of the inner surface.

In testimony whereof, I affix my signature.

ABRAHAM L. FREEDLANDER.